Patented May 14, 1940

2,200,563

UNITED STATES PATENT OFFICE 2,200,563

METHOD OF PREPARING ORES TO FACILITATE EXTRACTION OF METALS

Kenneth M. Simpson, New York, N. Y.

No Drawing. Application May 24, 1937, Serial No. 144,551. Renewed December 20, 1939

3 Claims. (Cl. 75—121)

This invention relates to a method for treating ores to facilitate the extraction of the desired metals from the gangue.

The invention is based in part upon the discovery that when ores of various types are subjected to an appropriate temperature, while in a neutral atmosphere, sufficient change in the form or structure of the minerals composing the gangue occurs to facilitate or permit the extraction of the contained metals.

I have discovered that by subjecting ores of various types to a sufficient temperature and for a sufficient period of time, while in a neutral atmosphere, a decomposition of the minerals composing the gangue occurs, accompanied by a change in the form structure and porosity of such minerals which greatly facilitates or permits the extraction of the desired metals.

My process is useful in the treatment or preparation of a wide variety of ores, including, as examples, ores containing silicates of copper, quartz ores containing gold and silver, and in fact all ores containing quartz and silicates.

In accordance with my process the ore undergoing treatment must be subjected to and maintained at a temperature while in a neutral atmosphere sufficiently high and for a sufficient period of time to change the form or structure of the minerals composing the ore, thereby tending to disrupt the particles constituting the ore and increasing the porosity thereof. This resultant structure facilitates the action of the treating agent to be used for the removal of the desired metals.

The temperature and the time of the heat treatment applicable for the processing of one ore may not be suitable for the treatment of other ores. However, in the treatment of any ore a sufficient temperature is to be provided and the time of the heat treatment is to be sufficient to cause a change in the form or structure of the minerals composing the ore to permit the extraction of the desired metals by any well known method. In general it may be said that a temperature above 1400° F. is almost invariably necessary, and in many instances a temperature varying from 1600° F. to 2200° F. has been found suitable.

As an example of the process, I shall first refer to the treatment of certain tin ores which are mined at the Pinyok Mines in Siam. This ore is composed very largely of iron-bearing garnet with some tremolite, the latter being an amphibole type of silicate. The tin (to the amount of 3% of the ore) occurs in the garnet and in the tremolite. In this case, treatment of the ore at a temperature of from 1600° F. to 1800° F. in a practical neutral atmosphere for a period of time of from one hour to five hours results in the decomposition of the original minerals to such an extent that practically all of the tin becomes soluble in both acids and certain alkalies, and especially soluble in a solvent made by fusing two parts of soda ash with one part of sulphur, and which is described in my pending application Serial No. 144,552, filed May 24, 1937, relating to Method and composition for dissolving and recovering tin. By a practical neutral atmosphere I mean one which is neither actively oxidizing nor reducing; in other words I do not add any carbon or other reducing material, nor do I permit the presence of any considerable quantity of air or oxygen in the chamber in which the ore is being treated. In the case of the example relating to tin ore, the tin is removed from the treated ore by leaching, following the customary leaching practice, the leaching solution preferably being the one mentioned in my co-pending application.

Another example of the process relates to the treatment of certain gold-bearing quartz ores from which the gold is with great difficulty dissolved by cyanide solution. In the preparation of such an ore for the extraction of the gold, the ore is subjected to a heat treatment ranging in the general neighborhood of 2350° F., preferably for a period of eight hours, while in a neutral atmosphere, although with different gold ores this temperature and time requirement may be substantially varied. Following this heat treatment in the neutral atmosphere the ore, either with or without further grinding or comminution, is immersed in the usual cyanide solution and the gold is thereby recovered, following the standards of cyanidation practice. The treatment of the ore in the manner aforesaid has changed the form or structure of the minerals comprising the gangue to an extent which will materially facilitate the extraction of the gold by the defined process.

As a further example of my process, I may subject certain copper silicates to a treatment similar to that described above for tin ore, following which heat treatment the copper may be removed by sulphuric acid type of leaching.

While I have disclosed and referred to certain examples applicable to the treatment of certain specific ores, it is understood that the process is not limited to the treatment of such ores, but may be used for preparing ores generally for the subsequent extraction of the desired metals.

Now having described the invention, what I claim is:

1. The method of preparing silicate ores for the extraction of the desired metals from the gangue, comprising subjecting a silicate ore while in a neutral atmosphere to a temperature and for a time sufficient to decompose the minerals composing the gangue to change the form and volume thereof to facilitate subsequent extraction of the desired metals, and thereafter removing the desired metals from the prepared ore by a leaching solution.

2. The method of preparing silicate ores containing tin for the extraction of tin therefrom, comprising subjecting the ore while in a neutral atmosphere to a temperature and for a sufficient time to change the form of the minerals composing the ore to facilitate the extraction of the tin from the ore.

3. The method of preparing silicate ores containing tin for the extraction of tin therefrom, comprising subjecting the ore while in a neutral atmosphere to a temperature and for a sufficient time to change the form of the minerals composing the ore to facilitate the extraction of the tin from the ore, and removing the tin from the ore by subjecting the same to the action of an aqueous leaching solution containing a fused mixture of sodium carbonate and sulphur.

KENNETH M. SIMPSON.